United States Patent Office 2,867,290
Patented Jan. 6, 1959

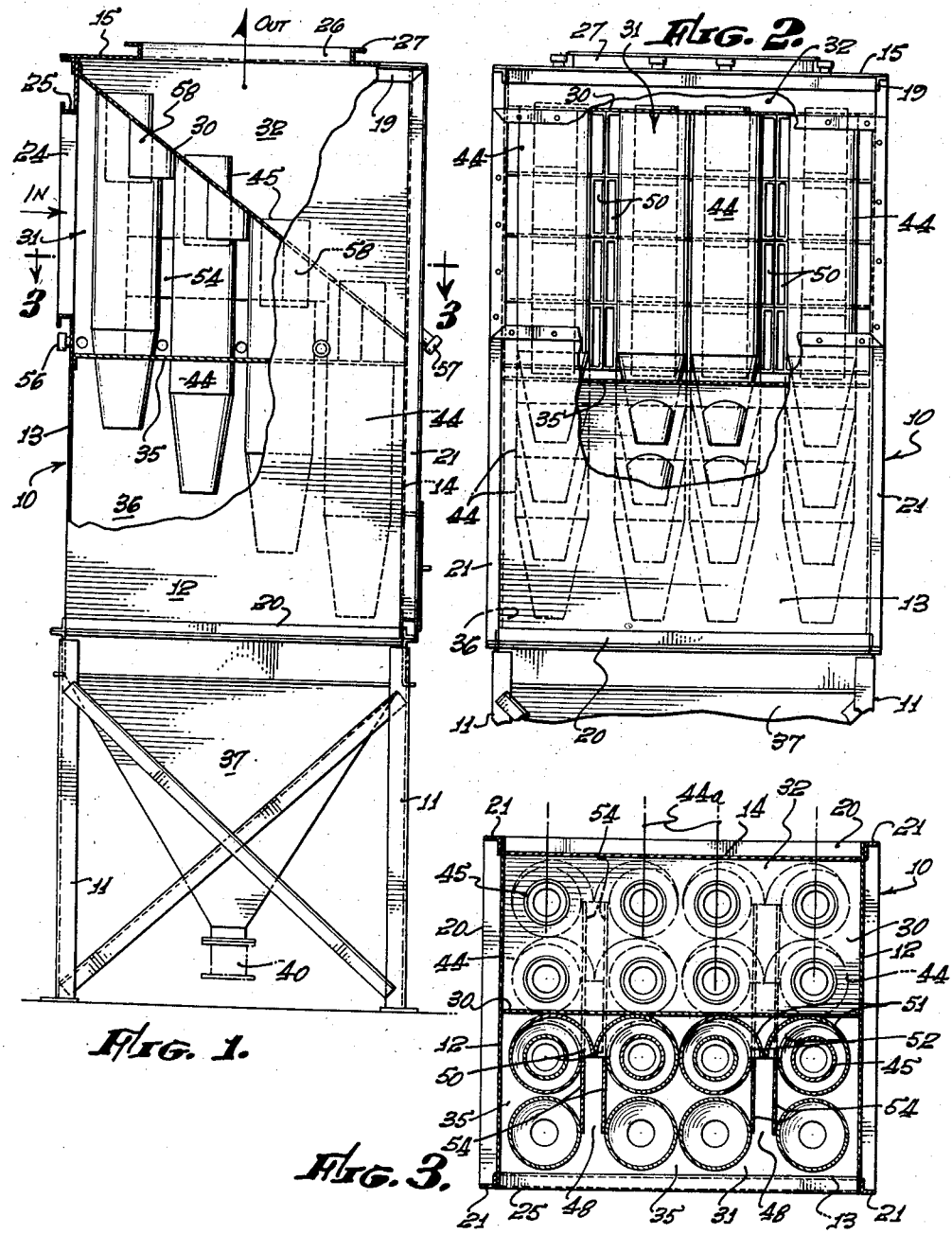

2,867,290

MULTIPLE ELEMENT CYCLONIC SEPARATOR

Norman M. McGrane, Long Beach, Calif., assignor to Western Precipitation Corporation, Los Angeles, Calif., a corporation of California Original application March 16, 1953, Serial No. 342,653, now Patent No. 2,768,744, dated October 30, 1956. Divided and this application July 9, 1956, Serial No. 596,617

2 Claims. (Cl. 183—83)

This invention relates to means for treating gaseous fluids for the separation of suspended material therefrom, and more particularly relates to improvements in a device of this character incorporating multiple cyclonic elements.

The present application is a division of my co-pending application Serial No. 342,653, filed March 16, 1953, for "Multiple Element Cyclonic Separator," now Patent No. 2,768,744, granted October 30, 1956.

It is well known that a single cyclonic element of relative small diameter is more efficient than a single large diameter element and will remove from a stream of gas suspended particles too small for separation in the larger diameter element. It follows that a plurality of small diameter cyclonic elements used to treat a large gas stream should have the same higher level of efficiency. Certain practical difficulties, however, commonly prevent attainment of the theoretical efficiency.

One problem is to obtain substantially uniform effective pressure differentials across all the various cyclonic separator elements with substantially the same inlet pressures at all the individual elements. An important object of the invention, therefore, is to provide a separator incorporating a plurality of small diameter cyclonic elements arranged to obtain uniform distribution of the incoming gas stream among the separator elements with maximum possible efficiency in each element.

Broadly described, the invention attains its objects by employing a housing enclosing a plurality of cyclonic elements in the form of separating tubes positioned in an inlet chamber opposite a front gas inlet of the housing with the successively rearward tubes in the chamber at successively lower levels along the path of the inflowing gas. The transverse top wall of the inlet chamber drops progressively in the direction of entering gas flow to lower levels at the successive separating tubes. Each separating tube has an axial outlet tube extending out of the separating tube through this transverse top wall into an outlet chamber that communicates with the gas outlet of the housing. The transverse top wall of the inlet chamber may either slope uniformly downward or step downward by stages to the levels of the successive tubes. This transverse wall not only separates the gas inlet chamber from the gas outlet chamber, but also preferably supports the outlet tubes and the upper end of the separating tubes. In addition, the transverse top wall cooperates with the separating tubes to form a portion of the involute inlet into the upper ends of the separating tubes.

To equalize pressures at the inlets of all the separating tubes requires minimizing resistance to gas flow through the inlet chamber so that the gas may move freely and equally to all the separating tubes. A feature of the invention to this respect is that minimum resistance to gas flow through the inlet chamber is achieved by arranging the separating tubes in rows extending in the direction of entering gas flow and spaced apart laterally to form between two rows of tubes a rearwardly extending gas passage. There may be several such passages. A further feature is the provision of involute inlets for the separating tubes with the involute walls of the inlet extending into one of the rearwardly extending gas passages to guide gas into the tubes. Also a feature of a preferred embodiment of the invention is the provision of straight side walls for at least a part of the length of the gas passage to minimize turbulence and eddying therein.

A second transverse wall is provided at a point below the first transverse wall, the second wall serving to divide the inlet chamber from the lower portion of the housing which becomes a hopper space into which the lower ends of all of the separating tubes open. The dust or other particles separated from the gas stream are discharged through the open ends of the tubes into this hopper space. In the present invention this second or lower transverse wall forms a floor to the inlet chamber and is disposed at the same level as the bottom of the involute inlet to the last or lowest tube in the row. Any material that settles out of the gas stream and drops onto this second transverse wall is swept rearwardly by the gas stream and carried into the inlet of the last tube in the row. After entering this last tube, the particles pass through the tube into the hopper space.

In this description, the gas inlet side of the housing is referred to as the front side and the opposite side is referred to as the back side, for convenient reference with respect to the direction of gas flow. These and any other directional terms, as for example "upper" or "lower" and the like, are used for descriptive purposes and are not intended to be necessarily limitative upon the invention.

The features and advantages of the invention will be readily understood from the following detailed description and from the accompanying drawing, in which:

Fig. 1 is a side elevation of a cyclonic separator constructed according to my invention, with a portion of the side wall of the housing broken away;

Fig. 2 is a fragmentary front elevation of the separator with a portion of the front wall of the housing broken away; and Fig. 3 is a horizontal section on the line 3—3 of Fig. 1, but rotated 90° counter-clockwise.

It will be apparent to one skilled in the art that the invention may be embodied in structures of other configuration than shown. In Figs. 1–3 a rectangular housing, generally designated at 10, is mounted on an angle iron framework that includes four legs 11. The outer housing may be made of metal sheets forming two spaced side walls 12, a front wall 13, a rear wall 14, and a top wall 15. The sheets forming these walls may be interconnected and re-enforced by horizontal angles 19 and 20 at the top and bottom of the housing respectively, and by the vertical angles 21 at the corners.

The housing 10 has a rectangular gas inlet opening 24 in the front wall 13 surrounded by an angle iron frame 25 to which suitable ductwork (not shown in the drawing) may be connected. A similar rectangular gas outlet opening 26 in top wall 15 is surrounded by an angle iron frame 27. Outlet 26 may exhaust directly to the atmosphere as shown or to any suitable type of gas duct (not shown in the drawing) that may be connected to flange 27. A feature of the invention is that the gas inlet 24 and the gas outlet 26 may alternatively be at the same level and in alignment with each other, the gas outlet then being in rear wall 14. This alternative construction is shown in my co-pending application Serial No. 342,653 referred to above.

Inside of housing 10, a transverse wall 30, which may be made of steel plate, separates the space adjacent gas inlet 24 from the space adjacent gas outlet 26. The space below and to the left of transverse wall 30 is in communication with inlet 24 and is designated as inlet chamber 31. The space above and to the right of transverse wall 30 communicates with outlet 26 and is designated as outlet chamber 32. Wall 30 slopes downwardly and rearwardly with respect to the direction of gas flow entering through inlet 24 and extends entirely across the housing between side walls 12. This transverse wall is commonly referred to as a "tube sheet." A second transverse wall 35 is located below the first mentioned transverse wall, and is also commonly referred to as a "tube sheet." Wall 35 forms the bottom of inlet chamber 31 and separates this inlet chamber from the space 36 enclosed within the housing and below the wall. This latter space is the hopper space. The upper portion of the hopper space 36 is bounded by front and rear walls 13 and 14 and side walls 12; and the space extends downwardly into hopper 37 which tapers toward the bottom to lead to a suitable dust discharge valve 40 which may discharge the dust into any suitable type of receptacle or duct, not shown in the drawing.

Lower transverse wall 35 is preferably horizontal, as shown, for practical reasons; but it is within the scope of my invention to incline the wall downwardly and rearwardly to some degree as illustrated in my said copending application.

A plurality of cyclonic dust separating elements in the form of separating tubes 44 are located within housing 10, with their upper ends located within and in communication with inlet chamber 31. Each separating tube has a conically tapered lower portion which is open at the bottom, the opening in the lower end of the tube being in communication with hopper space 36. Tubes 44 are shown as having their axes vertical or substantially so, and this is a usual and preferred arrangement; but the invention is not necessarily limited to a vertical position for the tube axes. The separating tubes are open at their upper ends to receive gas and the particles suspended therein from inlet chamber 31; and the tubes are arranged in a plurality of rows which extends across the inlet chamber from front to rear, parallel to the direction of flow in the gas stream entering through inlet 24. These rows are hereinafter referred to as "longitudinal" and each includes the four tubes aligned along an axis 44a in Fig. 3. The successively rearward tubes in each row are positioned at successively lower levels, as may be seen particularly from Fig. 1. The upper ends of the separating tubes in the front of the inlet chamber adjacent inlet 24 are near the top level of gas inlet opening 24 while the upper ends of the rear-most tubes are near the bottom level of the gas inlet opening. With this arrangement, the successive tube inlets intercept successively lower fractions of the flowing gas stream, as will be further explained.

The slope of transverse wall 30 is determined by the downward spacing of the tubes with respect to each other since the transverse wall extends across and closes the open upper end of each separating tube 44. Each of the separating tubes has a short coaxial outlet tube 45 which extends upwardly through transverse wall 30 to communicate with outlet chamber 32. The cleaned gas leaves the separating tubes through outlet tubes 45 and enters outlet chamber 32 from which it is discharged through outlet opening 26.

In the particular form illustrated in the drawings, there are sixteen separating tubes 44 in the inlet chamber, arranged in four parallel longitudinal rows extending from front to rear of the housing. The tubes are also conveniently arranged in four transverse rows extending from side to side of the housing. The upper ends of the separating tubes are fastened to and supported from tube sheet 30. Transverse wall 35 engages each one of the tubes some point below the upper transverse wall, the position of engagement along the length of the tube depending upon the position of the tube in its longitudinally extending row.

The upper ends of the separating tubes are constructed and arranged to form a gas inlet that imparts a spinning motion to the gas stream as it enters each tube to form a downwardly moving vortex. The longitudinal rows of separating tubes are spaced apart laterally to form rearwardly extending gas passages that permit the inflowing gas to reach the rearward tubes in each row. In the particular construction shown, the four longitudinal rows of separating tubes 44 are arranged in two pairs of rows, the two rows of each pair being spaced apart to form between the two rows a rearwardly or longitudinally extending gas passage 48 of sufficient width for the required freedom of gas flow between the tubes from the front to rear of the inlet chamber.

This arrangement applies to any even number of longitudinal rows of separating tubes. If there is an odd number of rows, then it is necessary to duplicate a gas passage 48 in whole or in part to supply only the tubes in a single row. In this arrangement one wall of the gas passage would ordinarily be adjacent a side wall 12 of the housing.

Each of the separating tubes 44 has a forwardly facing gas inlet of the involute type, as indicated at 50 in Fig. 2. This inlet is shown in section in Fig. 3 for the second tubes in each of the longitudinally extending rows. Each involute inlet is formed by a vertically extending, horizontally curved, spiral wall 51 that blends tangentially into the upper end of the cylindrical wall of the separating tube. The involute inlet passage is further defined by a portion of transverse wall 30 which provides a top to the involute passage. The bottom of each involute passage is defined by an arcuate wall 52, shown in Fig. 3. As may be seen in Fig. 3, the forward edges of the spiral walls 51 of each pair of separating tubes located at opposite sides of a longitudinal gas passage 48, meet at the middle of the gas passage to divide equally between the two separating tubes the inflowing gas at the level of the involute passage.

Each of the longitudinal gas passages 48, at or below the level of the inlet to the second tubes of each longitudinal row, is provided with a pair of side walls 54 each formed by a flat, smooth plate mounted on the outside of the separating tubes. These plates extend rearwardly from about the center of the front tube to the involute inlets of the successive tubes in each row. The side walls 54 of the gas passages 48 may be made from a single sheet or they may conveniently be made as shown, in sections of varying length in the direction of gas flow, each section having a height equal to the vertical dimension of the involute inlet 50. Such wall sections abut each other along their top and bottom edges to eliminate openings through which the gas could pass to leave a passage 48 so that the several sections are, in effect, a solid wall. With four tubes in a longitudinal row, there are only three such sections to each side wall 54, as may be seen by reference to Fig. 1. No plate is required at the involute inlet of the first tube of each row because the spiral walls 51 of the two front tubes extend forwardly to substantially the center line of the tubes in the front row and, with tubes 44, provide the only means required to define the gas passage at this level. For each successive tube in the direction of gas flow, the distance of gas flow in a passage 48 is successively longer. Gas passages 48 are closed at the bottom by lower transverse wall 35 which engages the bottom edges of side walls 54. Thus there is defined a longitudinal gas passage extending between two adjacent but laterally spaced longitudinal rows of tubes, through which passage gas flows to reach inlets 50 of the individual tubes. The inlets 50 of tubes at opposite sides of the passage engage each other, as may be seen in Fig. 3, to close the rearward end of the gas passages and to divide the gas reaching the inlets between them.

Housing 10 may be provided with suitable rodding holes to permit the insertion of a rod or air lance at various points around and just above wall 35 for the purpose of dislodging any solid material that may be accumulated on top of transverse wall 35. In the present construction, pipe nipples 56 are mounted on the walls of the housing at these holes, the nipples normally closing the rodding holes but being removable to open them. Similar nipples 57 are provided to close rodding holes in rear wall 14 which are located in a position to provide access to the top surface of upper transverse wall 30.

Having described the construction of a preferred embodiment of my invention in a multiple tube cyclonic separator, its operation will be briefly described. The particle-laden gas stream enters the housing through gas inlet 24 and is substantially equally divided into smaller streams, two in this case, that flow rearwardly through longitudinal gas passages 48. A certain amount of the heavier particles suspended in the gas stream may drop out of the gas stream as it passes through inlet chamber 31. These heavier particles settle onto the horizontal tube sheet 35 which forms the bottom wall of each gas passage 48. When the dust concentration is high, there may be a considerable amount of material which accumulates on this transverse wall. The gas stream flowing through passages 48 tends to move such settled material along the horizontal tube sheet and eventually sweeps it into the inlets of the rearmost tubes where it is separated from the gas stream in the same manner as the other particles of dust.

The particle-laden gas entering the involute inlet 50 of each of the separating tubes 44 forms a vortex around the outlet tubes 45. The gas stream moves downwardly within the separating tube 44 in a spiral and then turns and spirals upwardly in a smaller inner vortex to enter the lower end of the outlet tube which is concentric of the separating tube. The particles of suspended material are separated by centrifugal action during the spiral movement and are carried by the downward spiral through the open lower end of the separating tube into hopper space 36. The separated particles collect in hopper 37 and are removed as often as may be required through dust valve 40. The clean gas from the several outlet tubes 45 enters outlet chamber 32 and then leaves the housing by way of outlet 26.

The fact that the incoming gas stream reaches all of the separating tubes with substantially the same degree of freedom, and the further fact that all of the separating tubes 44 are of equal length, as are also the outlet tubes 45, makes for uniformity of distribution of the gas stream among the several separating tubes.

My description in detail of a presently preferred embodiment of the invention may suggest to those skilled in the art various changes, substitutions, or other departures from the above disclosure that properly lie within the spirit and scope of the appended claims. For example, it may be desirable to use a stepped upper transverse wall 30 as shown in my said co-pending application instead of the uniformly sloping wall illustrated herein.

Hence it is to be understood that the foregoing description is considered as being illustrative of, rather than limitative upon, the invention as defined by the appended claims.

I claim:
1. Apparatus for separating suspended particles from a stream of gas by centrifugal action, comprising: a housing having a gas inlet and a gas outlet; a pair of rows of separating tubes inside the housing, each tube having a forwardly facing involute inlet near the top and the rows each containing a plurality of tubes, each row extending generally in the direction of flow of the gas stream entering the housing and having the tubes in that row at levels progressively lower in said direction of gas flow, and the rows being spaced transversely of the direction of said gas flow to allow the gas to pass between forward tubes to reach and enter rearward tubes of the rows; an upper transverse wall within the housing cooperating with the housing to define an inlet chamber and an outlet chamber communicating respectively with the gas inlet and the gas outlet of the housing, said wall extending rearwardly and downwardly across successively lower levels of the path of gas flowing into the housing through said inlet and closing the upper end of said separating tubes and the involute inlets; an outlet tube concentric of each separating tube and extending upwardly through said transverse wall; and a lower transverse wall within the housing cooperating with the housing to define the bottom wall of said inlet chamber and a hopper space beneath said second wall, said lower wall engaging the tubes in each of said rows at different relative positions along the length of the tubes and being at the level of the bottom of the gas inlet of the last tube of each row.

2. Apparatus as in claim 1 which also includes vertical wall members adjacent the sides of the laterally spaced rows of separating tubes, said vertical wall members extending rearwardly from the forward separating tubes to the inlets of the other separating tubes and in cooperation with the two transverse walls forming a gas passage for rearward flow of gas from said housing inlet to the tube inlets rearward of the forward separating tubes.

References Cited in the file of this patent

UNITED STATES PATENTS

| | | |
|---|---|---|
| 2,327,691 | Allardice | Aug. 24, 1943 |
| 2,433,774 | Madely | Dec. 30, 1947 |
| 2,439,850 | Heller | Apr. 20, 1948 |
| 2,533,991 | Blomquist et al. | Dec. 12, 1950 |

FOREIGN PATENTS

| | | |
|---|---|---|
| 473,484 | Great Britain | Oct. 11, 1937 |
| 379,989 | Italy | Apr. 15, 1940 |
| 497,568 | Canada | Nov. 10, 1953 |